United States Patent [19]

Modegi et al.

[11] Patent Number: 5,566,283
[45] Date of Patent: Oct. 15, 1996

[54] COMPUTER GRAPHIC IMAGE STORAGE, CONVERSION AND GENERATING APPARATUS

[75] Inventors: Toshio Modegi; Hideki Murota; Michio Kurata, all of Tokyo, Japan

[73] Assignee: Dainippon Printing Co., Ltd., Tokyo, Japan

[21] Appl. No.: 396,895

[22] Filed: Mar. 1, 1995

Related U.S. Application Data

[63] Continuation of Ser. No. 752,108, Aug. 29, 1991, abandoned.

[30] Foreign Application Priority Data

| Sep. 3, 1990 | [JP] | Japan | 2-232742 |
| Oct. 26, 1990 | [JP] | Japan | 2-290384 |
| Nov. 1, 1990 | [JP] | Japan | 2-296790 |

[51] Int. Cl.⁶ .................................................. G06T 15/50
[52] U.S. Cl. ...................... 395/126; 395/128; 395/130; 395/131; 395/162
[58] Field of Search ........................... 395/118–20, 130, 395/126–9, 162, 164, 425, 600

[56] References Cited

U.S. PATENT DOCUMENTS

| 4,435,752 | 3/1984 | Winkelman | 395/600 |
| 4,823,286 | 4/1989 | Lumelsky et al. | 395/132 |
| 5,063,375 | 11/1991 | Lien et al. | 395/126 |
| 5,247,634 | 9/1993 | Chine et al. | 395/425 |
| 5,339,411 | 8/1994 | Heaton, Jr. | 395/600 |

OTHER PUBLICATIONS

Wolf, Lawrence, "Diffuse reflection", *Computer Vision and Pattern Recognition*, 1992, pp. 472–478.

Strauss, Paul S., "A Realistic Lighting Model for Computer Animaters", *IEEE Computer Graphics and Applications*, 1990, pp. 56–64.

*Primary Examiner*—Heather R. Herndon
*Assistant Examiner*—Rudolph Buchez
*Attorney, Agent, or Firm*—Oliff & Berridge

[57] ABSTRACT

A computer graphic image generating apparatus for generating an image based on a computer graphic model including shape information, camera information, camera position information, object position information, texture information, light source information and mapping information which includes texture image information. The apparatus includes a storage device, or memory, and means for calculating the amount of space in the storage device required to store all the information used to generate an image. The apparatus also includes means for storing the information for an image in the storage device without wasting any storage space. The apparatus also includes means for converting image information created for a first image generating system having a first shading calculation system into image information usable on a second image generating system having a different shading calculation system. The apparatus may also include means for converting image information usable by the first system into an interface format so that the image information can then be converted into a format usable by the second system.

6 Claims, 10 Drawing Sheets

FIG. 2

: MEMORY SPACE USED

COMPUTER GRAPHIC IMAGE STORAGE, CONVERSION AND GENERATING APPARATUS

This is a Continuation of application Ser. No. 07/752,108 filed Aug. 29, 1991, now abandoned.

BACKGROUND OF THE INVENTION

1. Field of the Invention

The present invention relates to a computer graphic image generating apparatus and more particularly a computer graphic (termed CG hereinafter) image generating apparatus suitable for the production of computer-generated images, calendars, holograms, animations, commercial pictures, posters, high-definition still images and the like.

2. Prior Art

With the recent rapid advancement computers and the low costs and data-packaging density of memories, the computer graphic technique has made remarkable advancement in speed and high-data-packaging density. As a result, it is now considered to apply the computer-generated images in various fields such as image media information, high-definition still image programs and the like.

A computer graphic image generated by a computer displays an image of a picture taken by a camera by illuminating and shading a three-dimensional object. In general, the generation of a computer graphic data comprises a step for obtaining information about the object (CG model) and a rendering step in which the generated CG model is subjected to various processes so as to produce an image of the shading three-dimensional object.

The CG model generally comprises information concerning to the shape of an object which is to be computer-generated such as shape information representative of a cluster of surfaces, the three-dimensional position information of the shape of the object, camera position information of an (imaginary) camera which takes a picture of the object such as the position and direction of the camera, camera information such as an angle of view and the ratio between the height and width of a frame, texture information of the object such as the ambient reflectivity, lighting information for lighting the object such as the three-dimensional position, direction, directivity, color, characteristics and intensity of a lighting or flashing device, texture image information of the texture image for mapping on the surfaces of the object, mapping information such as characteristics of the mapping, and so on.

When a CG image is rendered based on the above-described CG model, all information required for CG rendering is stored in a memory with a suitable capacity and then required information is read out therefrom so as to carry out various processes. Especially when a CG image is generated by the ray tracing or scan line process, a system designer or a user estimates a required memory space in a memory for each information of CG model and selects a memory space in which is stored information required to generate each CG image.

Figure 8:
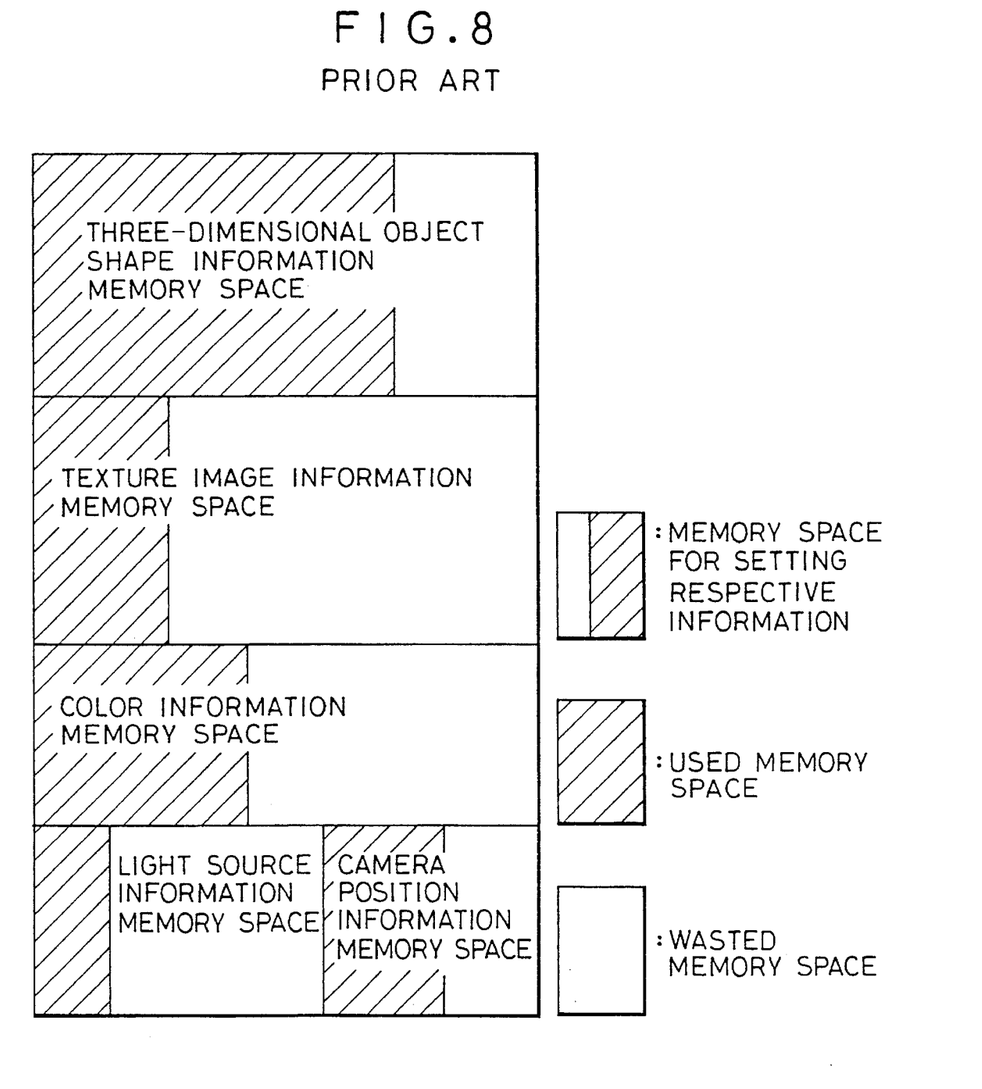
FIG. 8 is a flat view illustrating, as an example, the memory spaces in which is stored respective CG image generation information by a conventional CG image generating apparatus.

FIG. 8 illustrates a conventional method for determining the memory spaces in each of which is stored each information of CG model.

As shown in FIG. 8, in the conventional method, the memory space is determined with maximum storage capacity which was expected to be required in order to store respective CG model information.

However, when respective storage spaces are previously determined in the memory in order to store respective CG model information, the following problems result.

Firstly, the selection of the memory spaces is inflexible so that a problem results in case of the information storage process. That is, when even one of CG model information exceeds a previously selected storage space, this is detected as an erroneous operation so that the normal information storage operation cannot be carried out. That is, the erroneous information storage result. When such erroneous operation occurs and when a user can vary each of storage spaces, each storage space can be rearranged, but the information storage capacity of each storage space cannot be varied, it becomes impossible to carry out the CG image rendering process. When the storage capacity of each storage space cannot be varied as described above, a only process to be left is to decrease CG model information and the whole process must be repeated. Thus, the CG rendering process becomes cumbersome and a CG image with desired degree of quality cannot be obtained.

Furthermore, in almost all the cases, the storage capacity of each storage space in which is stored CG model information is, as shown in FIG. 8, determined as a maximum storage capacity which was expected to be required. As a result, waste storage spaces are increased. Especially, in the case of an apparatus which carries out two CG rendering in parallel with a common memory, the memory utilization efficiency is very low.

In general, in the case of the rendering of CG model stored in the memory in the manner described above, a CG system which uses languages and commands in common with those used in the CG model generating computer is used. For instance, it is considered that a series of processes from the generation of the CG model and the rendering are carried out by a system in which a CG model generating computer integral with a rendering computer.

Furthermore, it is also considered that the CG model is generated by a certain system A and the CG model thus obtained is rendered by another system B. This process has been frequently carried out.

Especially in some cases, when the processing speed of the system B is high, it is desired that the CG model generated by the system A is processed by another system B which has a high processing speed. In this case, in general the shape information in the CG model is generated by the system A and transferred to the system B.

However, as to the other information (the texture information, the light source information, the mapping information and so on) than the shape information of CG model, it has been impossible to carry out the rendering in the system B by transferring only the CG model information from the system A to the system B because or the difference in the shading calculation model between two systems.

Therefore, when it is desired that a CG model that is generated by a certain system A be processed by another high-speed system B, only the shape information of the CG model can be delivered to the system B and the remaining information of the CG model must be rendered by the system A or a system which can use the shading model corresponding to the remaining data of the CG model.

As a result, for example, a CG model generated by a low-speed system can not be rendered by a new and high-speed system and therefore it must be rendered by a low-speed system so that there is a problem that the speed-up of the CG generation is difficult.

Furthermore, in the CG image generation, a different CG model except the shape information (such as the texture information and so on) must be generated for respective CG image generation system so that there is a problem that the working load is very great.

A yet another problem is that when some of CG model information read out from the system A, it cannot be used because of the difference of information format.

SUMMARY OF THE INVENTION

A first invention was made to solve the above-described and other problems encountered in the conventional CG image generating apparatuses and has for its object to provide a computer graphic (CG) which can automatically select a memory space corresponding to respective CG model information, thereby preventing the re-selection of each storage space and using a minimum memory required for the CG image rendering, whereby the efficiency of the memory usage can be improved.

A second invention has for its object to provide a CG image generating apparatus including a rendering device which makes it possible to convert a CG model generated by a first system by absorbing the difference from a shading calculation model in a second system so that it can be used in the second system so that it becomes possible to generate a CG image data at a high speed and the CG image data thus generated can be utilized in various fields.

A third invention has for its object to provide a CG image generating apparatus including a rendering-interface device which can absorb the difference between a CG model generated by a first system and a shading calculation model used in a second system so that the CG model can be converted so as to be used in the second system so that it becomes possible to generate the CG image data at a high speed and to increase the fields in which the CG image data can be utilized.

In a CG image generating apparatus of the type for generating a CG image based on computer graphic generation information such as object shape information, camera information, camera position information, information about the position of the object shape, texture information, light source information, mapping information including texture image information and the like, according to the first invention, the CG image generation apparatus further comprises memories for storing therein respective above-mentioned CG model information, respectively; means for calculating the capacity of each memory required for storing therein the respective information based on the quantity of the data thereof, means for allocating a memory space in which respective information is stored based on the calculated memory capacity and means for storing respective information into the memory spaces thus allocated, respectively, whereby the above-described object is attained.

In a CG image generating apparatus of the type in which CG model consisting of object shape information, camera information, camera position information, information about the positions of the object shape, texture information, light source information, mapping information including texture image information and so on generated by a first system is rendered by a second system whose shading calculation model is different from that of the first system, according to the second invention, said system further comprises an interface including means for receiving the texture information from a first system and converting it for the texture information for a second system, means for receiving the light source information from the first system and converting it the light source information for the second system, and means for receiving the mapping information from the first system and converting it for the second system; and means for converting, of the information read out from said first system, information which is read out from said first system in a format different from the information format of the interface into the interface information format.

In a rendering—interface device in a computer graphic image generating apparatus of the type converting CG model comprising object shape information, camera information, camera position information, information about the position of the object shape, texture information, light source information, mapping information including texture image information and so on generated by a first system into a CG model for a second system and delivering it to the second system and rendering, according to the third information, said rendering—interface device further comprises means for receiving the texture information parameter from the first system and converting it for a second system, means for receiving the light source information parameter from the first system and converting it for the second system and means for receiving at least one of the texture image information parameter and the mapping information parameter from the first system and converting it for the second system, whereby said object can be attained.

In the computer graphic image generating apparatus, the object shape information is represented by the collection of surfaces, and the mapping information of the surfaces is represented by the collection of the vertex coordinates of the surfaces and by the coordinates of the texture image.

Further in the computer graphic image generating apparatus, the parameter of the texture information includes the specular reflection factor parameter of the object surface, said means for the texture information parameter converts the texture information parameter of the first system into for the second system by using a correction coefficient to match the high light in both of the first and second systems.

More further in the computer graphic image generating apparatus, the parameter of the texture information includes a parameter of a specular reflectivity of the object surface, said means for the texture information parameter converts the specular reflectivity parameter for the first system into specular reflectivity parameter for the second system by using the specular reflectivity parameter and the diffuse reflectivity parameter for the first system.

According to the first invention, in a storage device for a CG image generating apparatus, a memory capacity required for respective information is calculated from the data quantity of respective CG model information, and based on the calculated memory capacity, memory spaces in the storage device each for storing therein respective information are selected so that respective CG image generation information is stored in said spaces.

Figure 2:
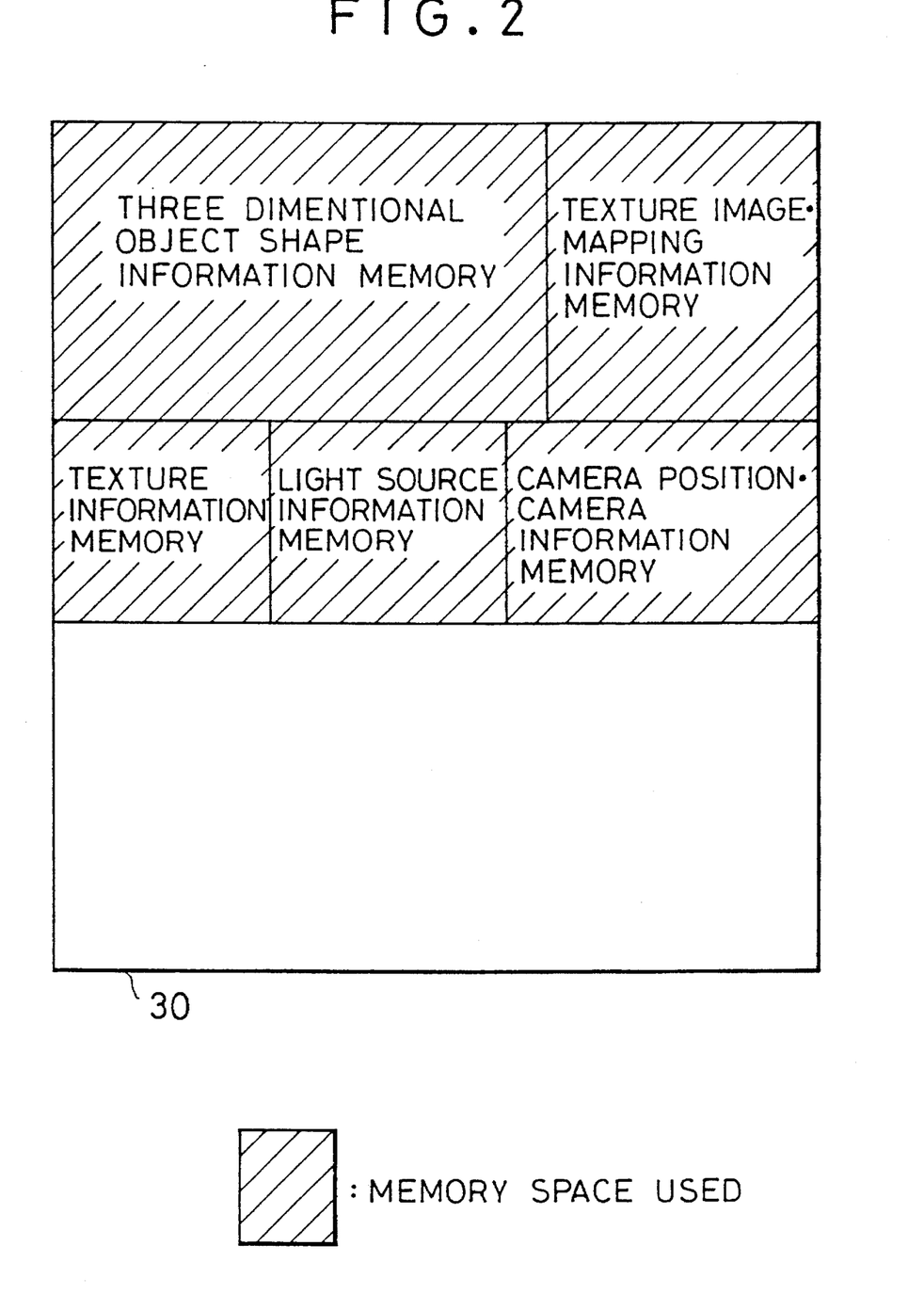
FIG. 2 is a flat view illustrating memory spaces in each of which is stored respective CG generation information in order to explain the underlying principle of the present invention.

FIG. 2 shows, as an example, the memory spaces selected by the present invention for storing therein respective CG model information (the three-dimensional information of the object shape, the texture image information, the mapping information, the texture information, the light source information, the camera position information and so on). As is clear from FIG. 2, according to the present invention, based on CG model information, memory spaces for respective information are selected and respective information is stored in the memory spaces thus selected without wasting the storage space.

According to the prior art, even when at least one data of CG image generation information overflows a selected memory space, the normal processing is impossible. However, according to the present invention, unless the whole capacity of CG image generation information is in excess of the whole capacity of the storage device, the correct processing can be carried out. Therefore, according to the present invention, the capacity of each memory space is not previously limited and it is not needed to re-select a memory capacity, so that the CG image generation process is much facilitated.

Furthermore, since the CG image generation process can be carried out with a minimum storage capacity, the memory utilization efficiency is high. Especially, in the case of an apparatus in which different CG image generation processing are carried out in parallel with a common storage device, the memory utilization efficiency can be further improved.

The CG model used in a first system has never been used at the CG model for use in a second system whose shading calculation model is different from that of the first system.

On the other hand, according to the second invention, the texture information from the first system is converted into the texture information for the second system. The light source information from the first system is converted into the light source information for the second system. The mapping information from the first system is converted into the mapping information of the second system. Thus the difference in shading calculation between the first and second systems can be absorbed.

Furthermore, of the information read out from the first system, information whose format is different from an interface format such as camera information, camera position information, light source (the three-dimensional position and so on) information and object-shape (the three-dimensional position) information is read out and such information cannot be converted at the interface without modifying information. Therefore according to the second invention, the information read out is recorded in the interface format.

As a result, the CG model generated by the first system can be delivered to the second system and rendered so that the CG image generation efficiency is improved.

It follows that it is not needed to determine different CG models for various systems A, B, . . . and so on. As a consequence, the processing can be simplified. In addition, it is not needed to store and control the CG models for each system.

Moreover, the CG model data previously generated by a low-speed system can be rendered by another high-speed system. Therefore, the know-how of the CG image generation accumulated by an old system will not be lost and can be transferred to a new system. Furthermore, with the increase in speed of the computer, the speed-up of the CG system can be freely carried out and by utilizing the previously accumulated CG models, various rendering can be effectively carried out.

According the third invention, in the case of the conversion of the CG model of the first system into the CG model for the second system which is different in shading calculation from the first system, the texture information parameter of the first system is received and converted it into the texture information parameter for the second system; the light source information parameter of the first system is converted for use in the second system; and the mapping information parameter used in the first system is converted for use in the second system.

Therefore, the difference in shading calculation among various systems can be eliminated by the parameter conversion of the texture, light source, mapping image information parameters so that the CG model generated by the first system can be delivered to and rendered by the second system and consequently the CG image generation process can be much improved.

As a result, different CG models for respective systems A, B . . . and so on are not needed to determined so that the CG image generation process can be much facilitated. In addition, it is not needed to store and control the CG models for each system.

Furthermore, the rendering by a high-speed system can be carried on by utilizing the CG model previously produced by a low-speed system. As a result, without losing the know-how of the CG image generation process accumulated by the old system, a new system can be introduced. Moreover, with the increase in speed of the computer, the speed-up of the CG system can be freely accomplished. In addition, by utilizing the previously accumulated CG models, various rendering can be effected effectively.

BRIEF DESCRIPTION OF THE DRAWINGS

FIG. 6 (A), (B) and (C) shows a flowchart illustrating a specular reflection conversion procedure so as to explain the mode of operation thereof;

DESCRIPTION OF THE PREFERRED EMBODIMENT

The present invention will become more apparent from the following preferred embodiments thereof taken in conjunction with the accompanying drawings.

Figure 1:
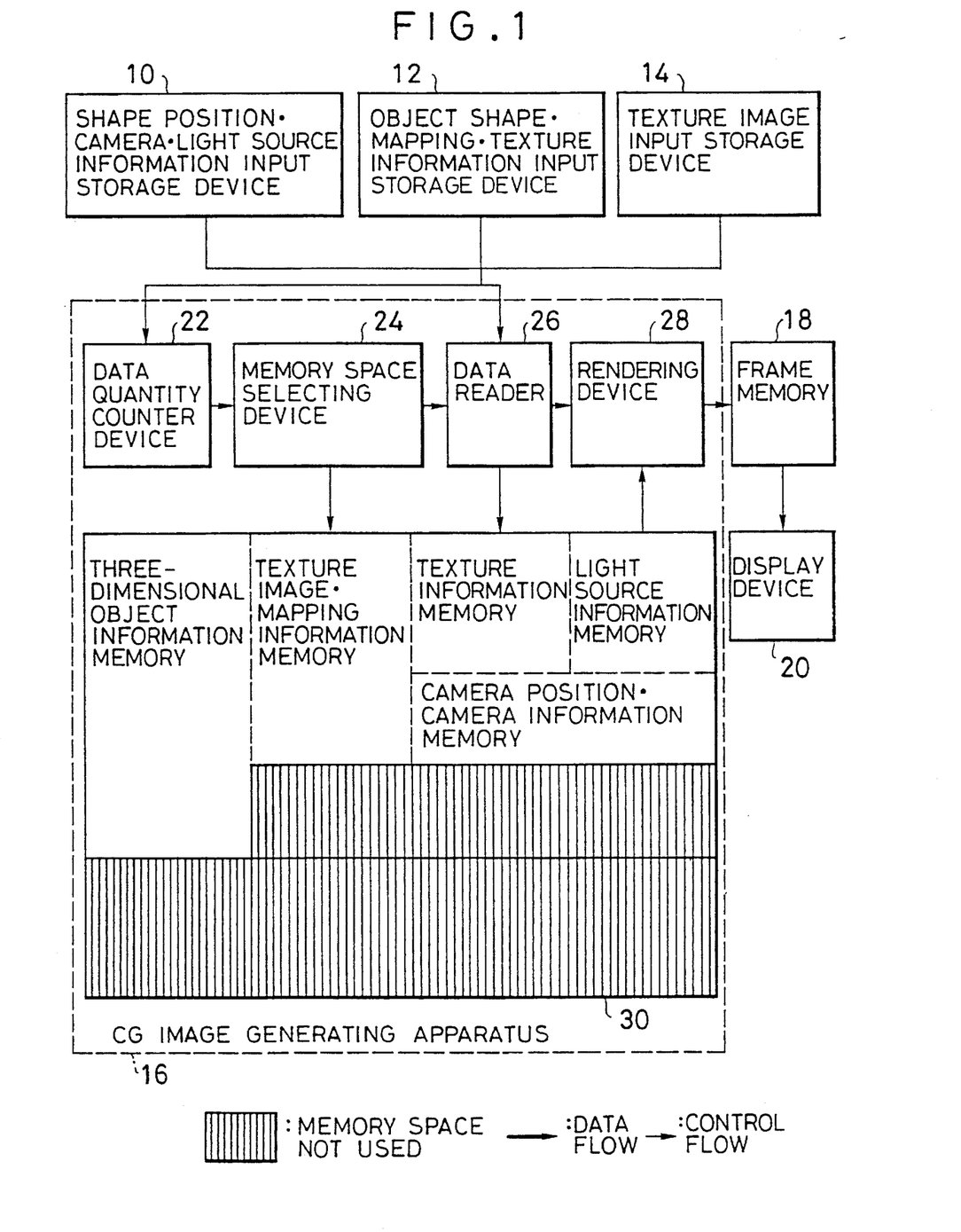
FIG. 1 is a block diagram illustrating the whole construction of a preferred embodiment of a computer graphic (CG) image generating system according to the present invention.

A first embodiment of a CG image generating system generates a CG image based upon the CG image generation information as shown in FIG. 1 and generally comprises a shape-position, camera and light source information input storage device 10, a shape, mapping and texture information input storage device (SMT input storage device) 12, a texture image input storage device 14, a CG image generating apparatus 16, a frame memory 18 and a display device 20.

The shape position, camera and light source information input device 10 is a device for storing therein information of three-dimensional positions concerning the shape of an object to be generated by computer graphics, a camera position information including a view point of the camera and the focused point, a camera information including an angle of view and aspect ratio of the camera, a light source information including a light source type, colors and intensity of the light and so on.

The SMT input storage device 12 is a device for storing therein the object shape information, the mapping information and the texture information concerning the shape of the three-dimensional object. In this embodiment, the object shape information is represented by the collection of surface information thereof. The surface information polygons each represented by the collection of the vertex coordinates (X, Y, Z). The mapping information is used for pasting a texture image over the shape of the object, and is the coordinates (u, v) of the mapping position in the texture image designated according to coordinates (X, Y, Z) of the surface. The texture information (color information) is parameters including ambient light reflectivity, diffuse reflectivity, specular reflectivity and so on of the each surface of the three-dimensional object.

The texture image input storage device 14 is used for receiving the texture image representing, for example, the patterns and grain of the surfaces of the object and is a scanner or the like.

The CG image generating apparatus 16 is an apparatus for reading therein the CG model such as object shape information, the mapping information, the texture image information, the object shape-position information, the camera information and so on so as to render and generate a CG image (in this embodiment, a two-dimensional image formed by the projection of a three-dimensional object). The construction of this apparatus will be described in detail hereinafter.

The frame memory 18 is a device for temporarily storing therein the two-dimensional image data "1024 pixels in the widthwise direction and 1024 pixels in the lengthwise direction; red (R), green (G) and blue (B)" produced from CG image projected on the two-dimensional surface by the CG image generating apparatus 16 and the stored CG image data are displayed by a CRT screen of the display device.

Prior to reading in the CG model information of the three-dimensional object storaged in the each input storage device 10, 12, 14, the CG image generating apparatus 16 counts the data quantity of the information, calculates the memory capacity required for storing the information and selects a minimum memory space in a storage device 30. The CG image generating apparatus 18 comprises a data quantity counter device 22 for counting the quantity of the data of the each information of the CG model, thereby calculating the memory capacity required for storing such information; a memory space selecting device 24 for selecting a minimum memory space in the storage device 30 based upon the capacity of the data counted in the manner described above; a data reader 26 for effecting the storage respective information data of the CG model in the selected memory spaces selected by the memory space selecting device 24; a rendering device 28 for projecting the three-dimensional object on the two-dimensional surface after rendering based on the information data of the CG model read in; and a data storage device 30 for storing therein respective information of the CG model.

Next the embodiment with the above-described construction will be described in detail.

Figure 3:
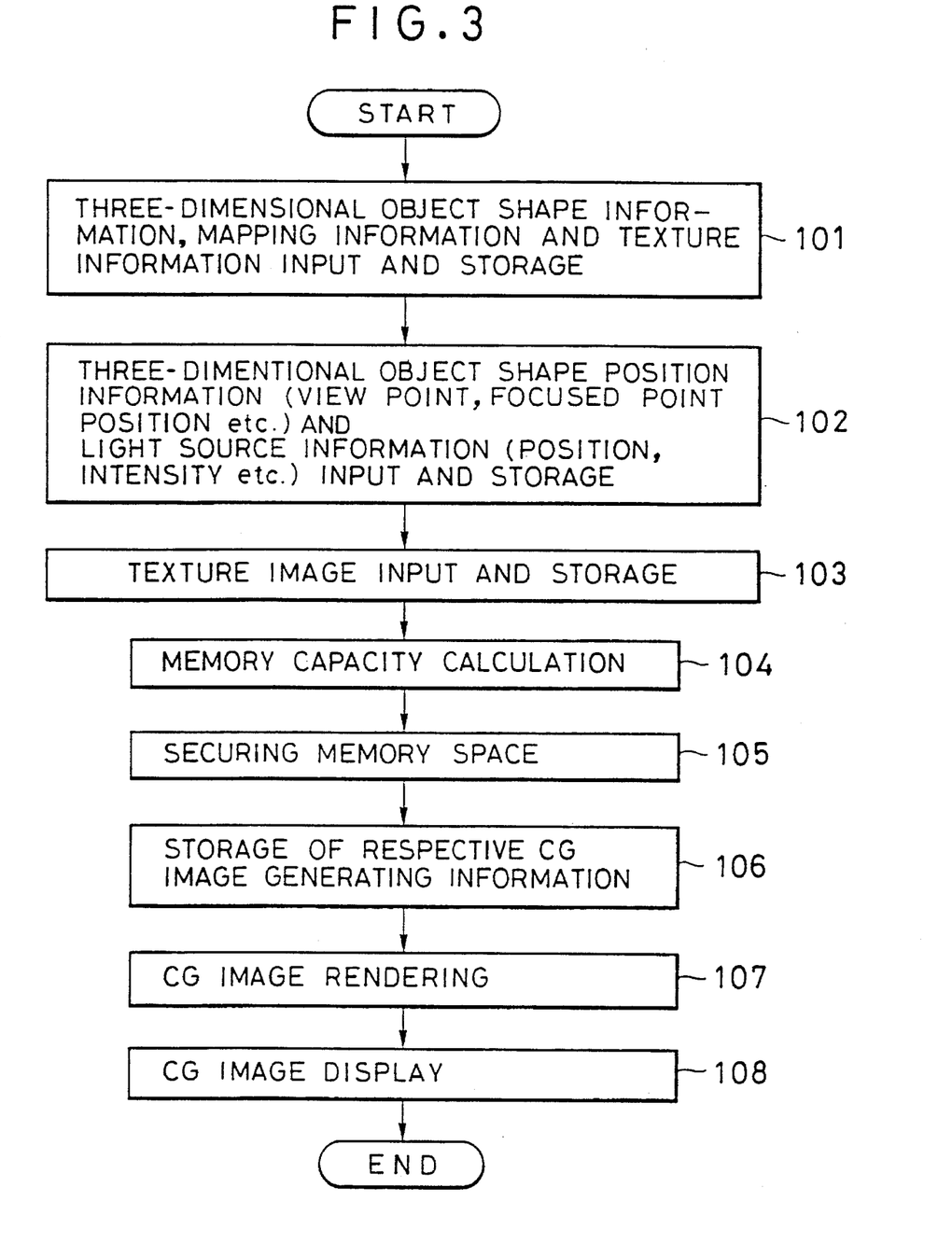
FIG. 3 is a flowchart illustrating the CG image generating procedure of the above-described system in order to explain the mode of operation thereof.

The embodiment generates a CG image in accordance with the flowchart shown in FIG. 3.

First, the SMT input storage device 12 receives and stores therein the object shape information, the mapping information and the texture information of a three-dimensional object (Step 101). In this case, the shape information is each of the surfaces defining the three-dimensional object represented in the form of the vertex coordinates (X, Y, Z). The mapping information represents the vertex coordinates (X, Y, Z) of the surface to be mapped in the form of the coordinates (u, v) of the texture image. Furthermore, the texture information (color information) is represented at red (R), green (G) and blue (B) in the form of the parameters of the ambient reflectivity, the diffuse reflection coefficient, the specular reflection factor and so on of each surface of the three-dimensional object.

Thereafter the device 10 receives and stores therein the information such as the position of the three-dimensional object, the camera position information (the point of view, the direction and so on), the light source information including the light position, the intensity of light and so on (Step 102).

Next the texture image input storage device 14 receives and stores therein the texture image information for pasting the shape of the object (Step 103).

The above-described steps can be carried out in any sequence or in parallel with each other.

Thereafter, the data quantity counter device 22 of the CG image generating apparatus 16 counts the memory capacity required for storing the CG image generation information (Step 104).

For instance, the memory capacity required for storing, for example, the surface with four vertexes is calculated by the following equation (1) as 48 bytes:

$$4 \text{ bytes} \times \text{three-dimensional information } (X, Y, Z) \times 4 \text{ vertexes} = 48 \text{ bytes} \quad (1)$$

It should be noted here that the capacity required for one real number is 4 bytes.

Furthermore, for instance, the memory capacity required to store the mapping information for said surface is calculated by the following equation (2) as 32 bytes:

$$4 \text{ bytes} \times \text{the two-dimensional information } (u, v) \times \text{four vertexes} = 32 \text{ bytes} \quad (2)$$

The texture (color) information is designated, for instance, as ambient light reflectivity etc., at each three color R, G and B as follows:

Ka red, green, blue (ambient light reflectivity by a surface)

Kd red, green, blue (diffuse reflectivity by a surface)

Ks red, green, blue (specular reflectivity by a surface) exp (specular reflection factor) transparency Then, the color information consists of 44 bytes when calculated by the following equation:

$$4 \text{ bytes} \times \text{three-color information } (R, G, B) \times 3 \text{ (the ambient light reflectivity, diffuse reflection, specular reflectivity)} + 4 \text{ bytes (specular reflection factor)} + 4 \text{ bytes (transparency)} = 44 \text{ bytes} \quad (3)$$

It should be noted here that the capacity required for storing in the texture information of one color is selected four bytes.

Furthermore, the memory capacity for storing one texture picture (for example, 512 pixel lengthwise×512 pixel widthwise) becomes 512×512=256 k bytes.

In the manner described above, the capacity required for storing the each information of the CG model.

Next the memory spaces for storing therein the each CG model information is selected based on the capacity in the manner described above (Step 105).

For instance, when the shape of an object is represented by 200 information data each representative of a surface with four vertexes, the storage space capable of storing therein 9.375 k bytes is selected because the storage of one surface required 48 bytes according to equation (1).

As to the mapping information, according to equation (2), the storage of one surface requires 32 bytes so that 32 bytes ×200 surfaces=6.25 k bytes are required.

As to the view-point information in the camera position information, 4 bytes×three-dimension=12 bytes must be selected. As to the focused-point information in the camera position information, 4 bytes×three-dimension=12 bytes must be selected.

As to the view-point information, 4 bytes×three-dimension =12 bytes must be spared. As to the focused-point information, 4 bytes×three-dimension=12 bytes must be selected.

As to the texture (color) information (just one color), 44 bytes must be selected according to equation (3).

As to one texture image (512×512), 512 bytes×512 bytes= 256 k bytes must be prepared for the storage. In addition, as needs demand, a working memory space for calculation must be secured.

Thereafter, the each CG model information must be stored in respective memory spaces thus selected or secured (Step 106).

Next in the rendering device 28, the brightness of a very small surface of the three-dimensional object is calculated based upon the each CG model information stored in the manner described above and the three-dimensional body is projected on the two-dimensional plane and the hidden view is eliminated, whereby a two-dimensional image is generated (Step 107). In this rendering, the scanning-line method, the ray tracing method, the Z buffer method or the like can be employed as a processing algorithm. Furthermore, regarding to the generation of a CG image, various techniques such as the technique disclosed in the co-pending Japan patent application No. 60-149765 applied by the same applicant, can be used. The detailed description of the contents of the above-mentioned patent application will not be explained in this specification.

Thereafter, the CG image data thus obtained is stored into the frame memory 18 and displayed by the display device 20 (Step 108). If necessary, the CG image data thus obtained can be delivered to an exterior device so as to be stored therein.

The CG image is generated in the sequence described above. In this case, respective CG model information such as the three-dimensional shape and so on is processed as shown in FIG. 1, the storage device 30 can be efficiently utilized.

It should be noted here that the CG image generating apparatus can utilize the memory space not selected so as to carry out more than two CG image generations in parallel.

In the first embodiment, it has been described that the extremely small surface of the three-dimensional object is calculated, and subjected to the projection on a two-dimensional plane and the hidden portions are eliminated, whereby a three-dimensional object is projected on the two-dimensional plane to generate a two-dimensional image, but it is to be understood that the images or pictures generated by the CG image generating apparatus in accordance with the present invention are not limited to the image generated in the above-described embodiment. For instance, the present invention can be equally and effectively used in the case of a wire-frame image generation which is disclosed in the copending Patent Application No. Hei 2-176983.

Referring next to FIGS. 4–7, a preferred embodiment of the second and third invention will be described in detail hereinafter.

This embodiment relates to the rendering system within the CG image generating apparatus 16 shown in FIG. 1.

Figure 4:
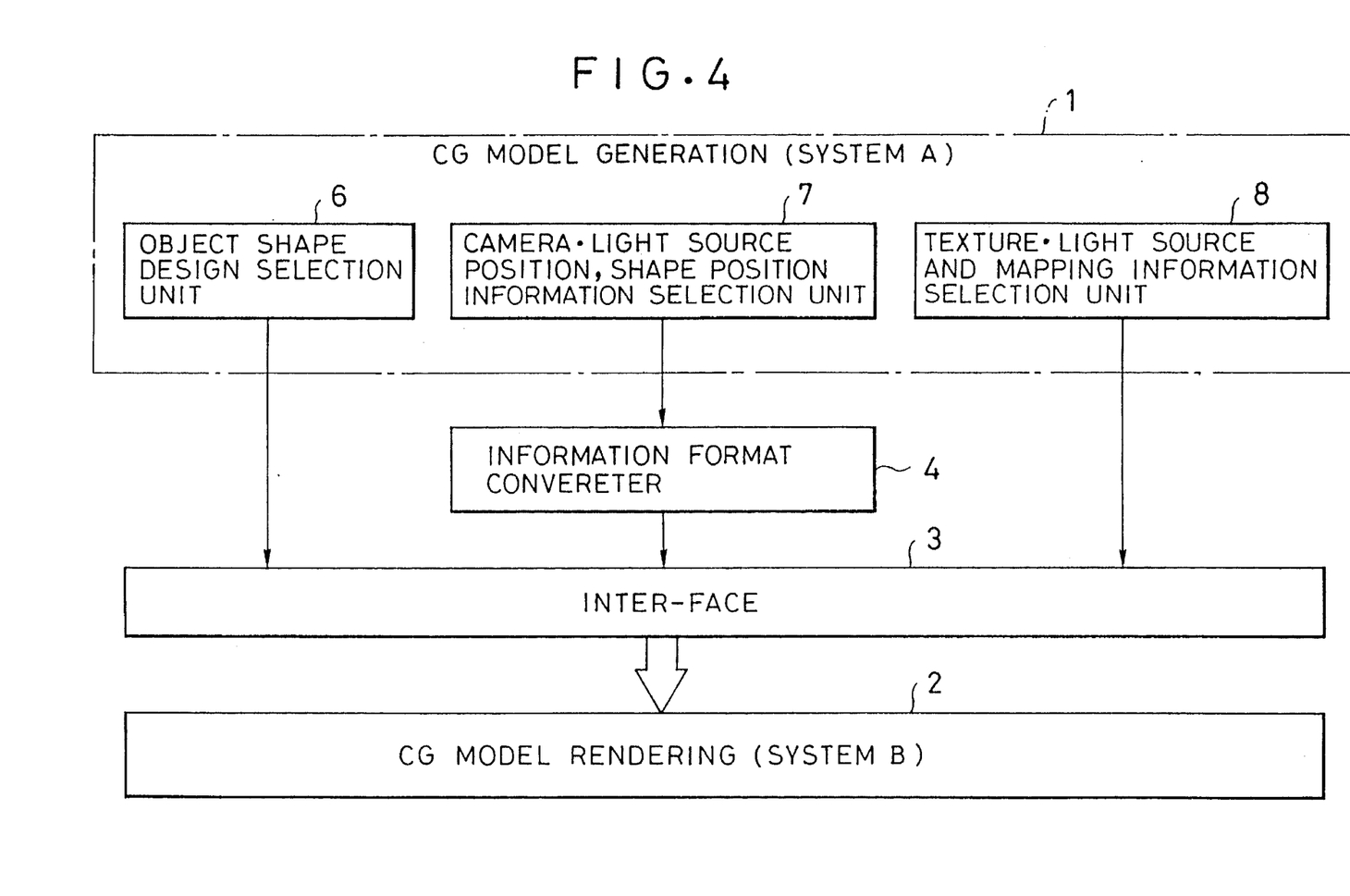
FIG. 4 is a block diagram illustrating the whole construction of a CG image generating system to explain a preferred embodiment of a second and a third invention.

As best shown in FIG. 4, this rendering system generally comprises a system A (indicated by the reference numeral 1) for generating the CG model, a system B (indicated by the reference numeral 2) whose shading calculation model is different from that of the system A, an information format conversion unit 4 which reads the camera information, the position information of an object and so on effects the rendering an information format of the read information and converts their format into an information format which can be used in an interface 3, and said interface 3 which absorbs the difference in shading calculation model between the systems A and B and delivers the result to the system B.

The system A generates a CG model and comprises, as shown in FIG. 4, a shape design-designation unit 6 for designing and designating an object to be represented by the computer graphics, a camera, light-source and shape-position information designating unit 7 for designating the camera information, the camera position information and the information of the position of shape of an object and texture, light source and mapping information designating unit 8 for designating the texture information of each surface of the object, the light source information (information other than the light position, for example light source type) and the mapping information including the texture image information. In this embodiment, the shape of the object is represented by the collection of surfaces each of which in turn is represented by the collection of the vertex information (coordinates X, Y, Z). The object shape position is represented by a three-dimensional position (coordinates X, Y, Z). The camera information includes an angle of view and aspect ratio of the camera used to take a photo of the object and the camera position information includes the position of the camera (the view point) and the direction of the camera. The texture information consists of the parameters of the reflectivity Ka of ambient light, the diffuse reflectivity Kd of a surface, the specular reflection factor Ks of a surface, the specular reflection factor exp and the transmission coefficient tra. The light information includes the parameters of a light source type (a point light source, a spot light source or a direct light source), colors, intensity of light, the position (three-dimensional position: coordinates X, Y, Z) and a damping factor. The mapping information consists of a kind of mapping (texture, bump and so on) and the scale of a mapping. The texture image information included in the mapping information is read by 512 pixels lengthwise×512 pixel widthwise. The above-described information will be described in more detail hereinafter.

The camera information, the camera position information, the three-dimensional light source position information and the three-dimensional object position information are read out in the format which is different from the information format used in the interface. Therefore, the information format conversion unit 4 converts the format of the above-described information into the format which can be used in the interface 3 and delivers the information of the converted format to the interface 3.

Figure 5:
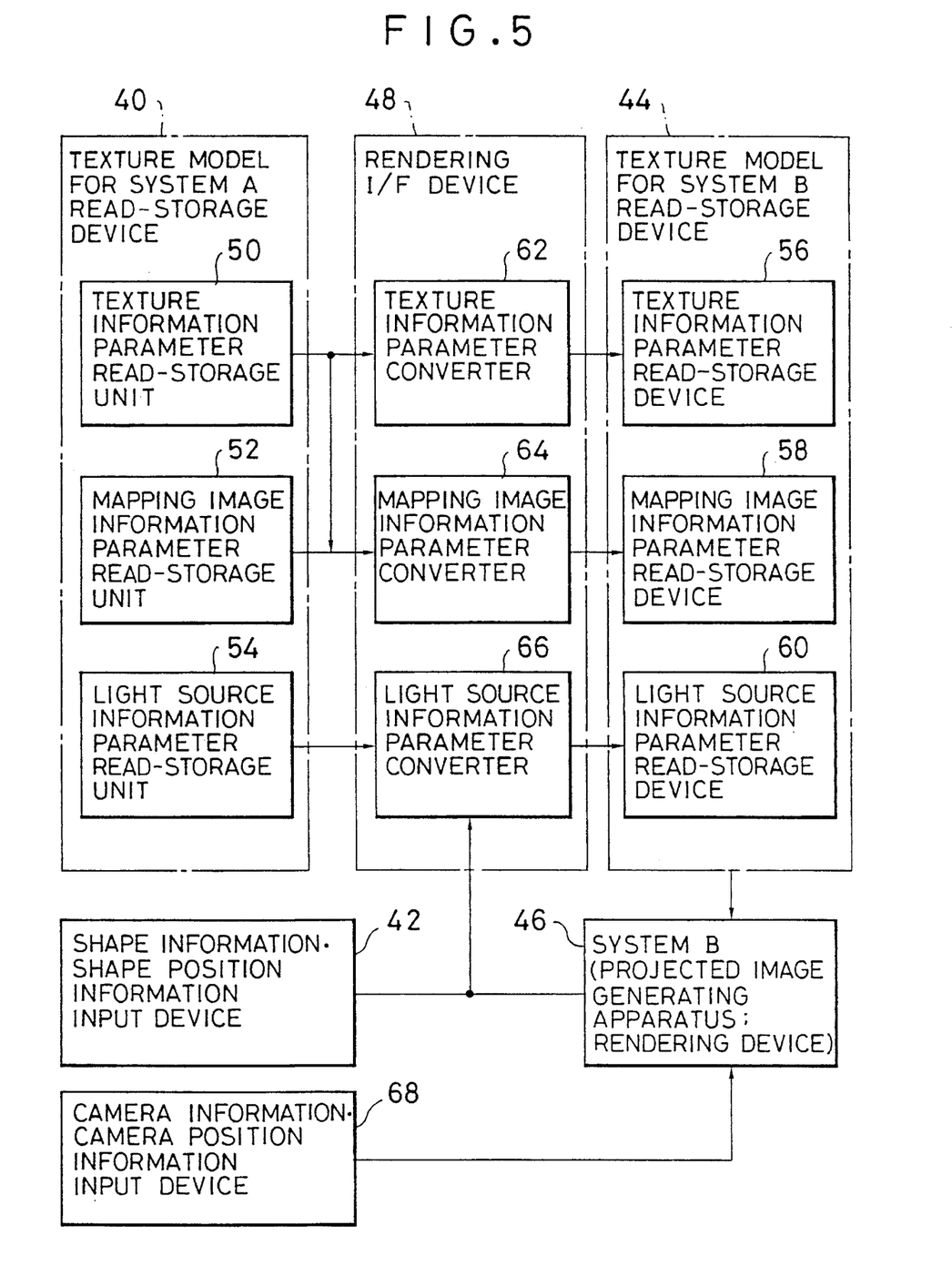
FIG. 5 is a block diagram illustrating the whole construction of an interface thereof.

The interface 3 has the construction shown in detail in FIG. 5 and delivers the CG model generated by the system A to the system B after absorbing the difference in shadow calculation between the systems A and B.

The system B effects the rendering of the CG model whose format was converted by the interface 3. In this case, for instance, the Z-buffer method, the ray tracing method or the like can be used.

Referring now to FIG. 5, the construction of the interface 3 will be described in detail. The interface 3 comprises a system A texture model read-storage device 40 for reading and storing the texture information parameter, the mapping image information parameter and the light source information of the CG model generated by the system A (The above-described three parameters are termed as the texture model); a shape-information and shape-position information input device 42 for inputting the information of the shape of the object and the three-dimensional position of the object shape information of the CG model; a camera information and position information input device 68 for inputting the data of the camera information and the camera position information of the CG model; a system B texture model read-storage device 44 for the texture model data for the system B which underwent the predetermined conversion after the delivery of the texture model data from the system A; a rendering interface (I/F) 48 for converting the texture model for the system A into the texture model for the system B and delivering the latter to the system B; and the system B (a projected image generating device; a rendering device) for reading the shape data and the shape position data from the device 42, the camera information and the camera position data from the device 68 and the texture model data for the system B from the device 44 and effecting the rendering processing of the information and data thus read out.

The system A texture model read-storage device 40 comprises a texture information parameter read-storage device 50; a mapping image information parameter read-storage device 52; and a light-source information parameter read-storage device 54, for reading and storing therein each parameter of the texture model.

The system B texture model read-storage device 44 consists of a texture information parameter read-storage device 56, mapping image information parameter read-storage device 58 and a light-source information parameter read-storage device 60, for reading and storing therein each delivered parameter of the texture model.

The rendering I/F device 48 comprises a texture information parameter converter 62; a mapping image information parameter converter 64 and a light-source information parameter converter 66, for converting each parameter so that the texture model for the system A into the texture model for the system B.

The camera information storaged in the camera information and camera position information input device 68 is represented by an angle of view and aspect ratio of the camera. The camera position information is represented by the three-dimensional position (the view point) and the three-dimensional direction of the camera.

Next an example of a set of conversion equations used for absorbing the difference in shading calculation model between the systems A and B by the rendering I/F device 48 when the parameter of the texture model for the system A is delivered to the system B, will be described.

First, the texture information parameter conversion is carried out in the texture information parameter converter 62 as follows:

In the case of each texture information parameter for the system A, notation (11) represents the ambient reflectivity (ambient: a); notation (12), the diffuse reflectivity (diffuse: d); notation (13), the specular reflectivity (specular: s); notation (14), the specular reflection factor (exponent: exp); and notation (15), the transparency.

$A\_a\_red, A\_a\_green, A\_a\_blue$ (11)

$A\_d\_red, A\_d\_green, A\_d\_blue$ (12)

$A\_s\_red, A\_s\_green, A\_s\_blue$ (13)

$A\_exp$ (14)

$A\_transparency$ (15)

where notations 11, 12 and 13 correspond to red, green and blue, respectively.

A parameter representing the reflectivity obtained from experience can be used as a parameter of the ambient reflectivity $A\_a\sim$.

As in the case of the ambient reflectivity $A\_a\_\sim$ in the system A, notations (16)–(20) represent the ambient reflectivity; the diffuse reflectivity; the specular reflectivity; the specular reflection factor and the transparency, respectively, for system B.

$B\_a\_red, B\_a\_green, B\_a\_blue$ (16)

$B\_d\_red, B\_d\_green, B\_d\_blue$ (17)

$B\_s\_red, B\_s\_green, B\_s\_blue$ (18)

$B\_exp$ (19)

$B\_transparency$ (20)

The above-described texture information parameters for the system A can be converted by the following equations into the texture information parameters for the system B.

First, as to the ambient reflectivity, when no texture image is mapped (pasted) over a surface, for instance, equations (21)–(23) can be used and when a image is mapped, for instance, the conversion equations (24)–(26) can be used.

$B\_a\_red = A\_a\_red$ (21)

$B\_a\_green = A\_a\_green$ (22)

$B\_a\_blue = A\_a\_blue$ (23)

$B\_a\_red = A\_a\_red / A\_d\_red$ (24)

$B\_a\_green = A\_a\_green / A\_d\_green$ (25)

$B\_a\_blue = A\_a\_blue / A\_d\_blue$ (26)

As to each diffuse reflectivity for the system A, it can be directly substituted into equations (27)–(29) in order to obtain the diffuse reflectivity for use in the system B.

$B\_d\_red = A\_d\_red$ (27)

$B\_d\_green = A\_d\_green$ (28)

$B\_d\_blue = A\_d\_blue$ (29)

Figure 6A:
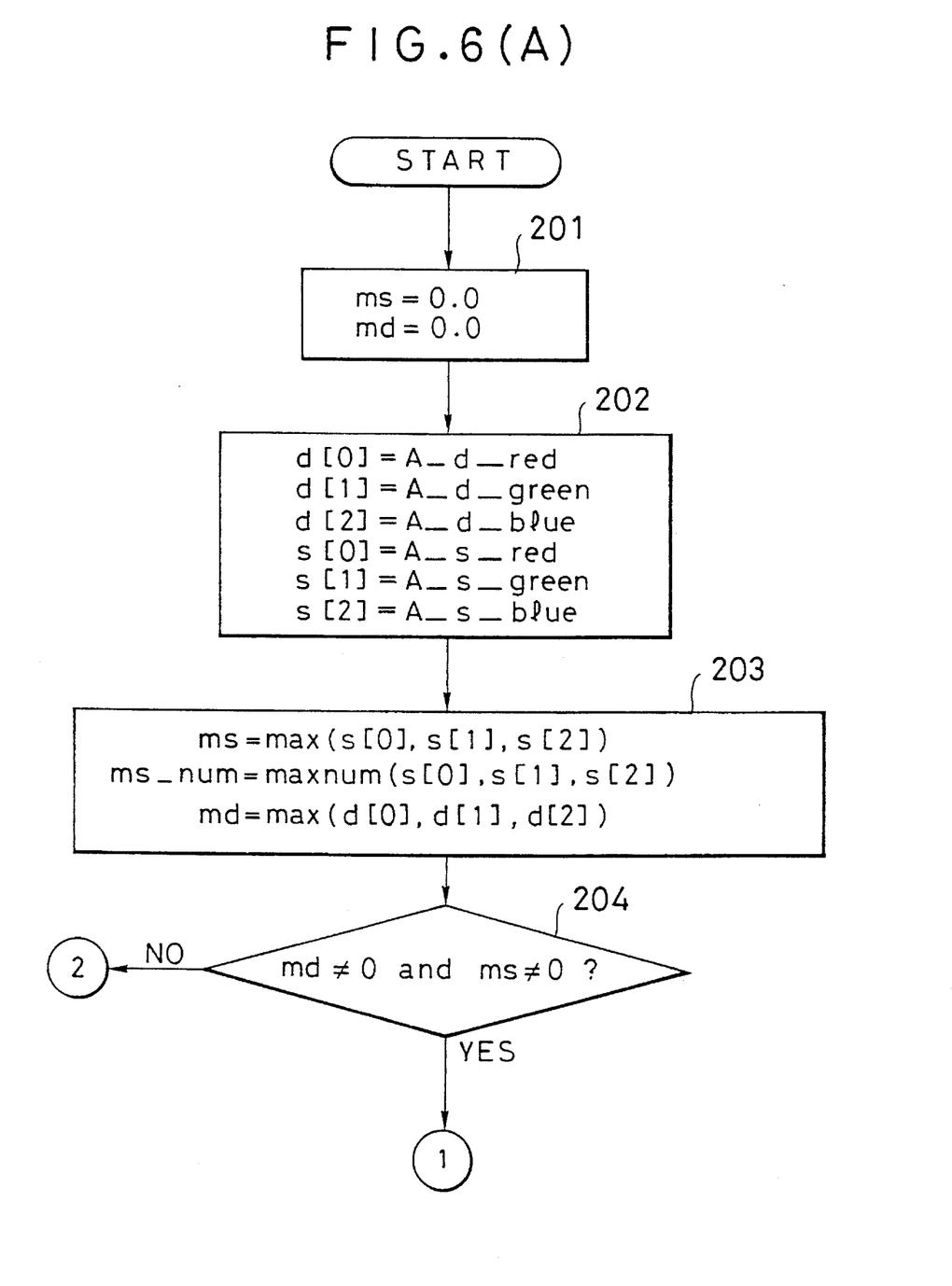
Figure 6B:
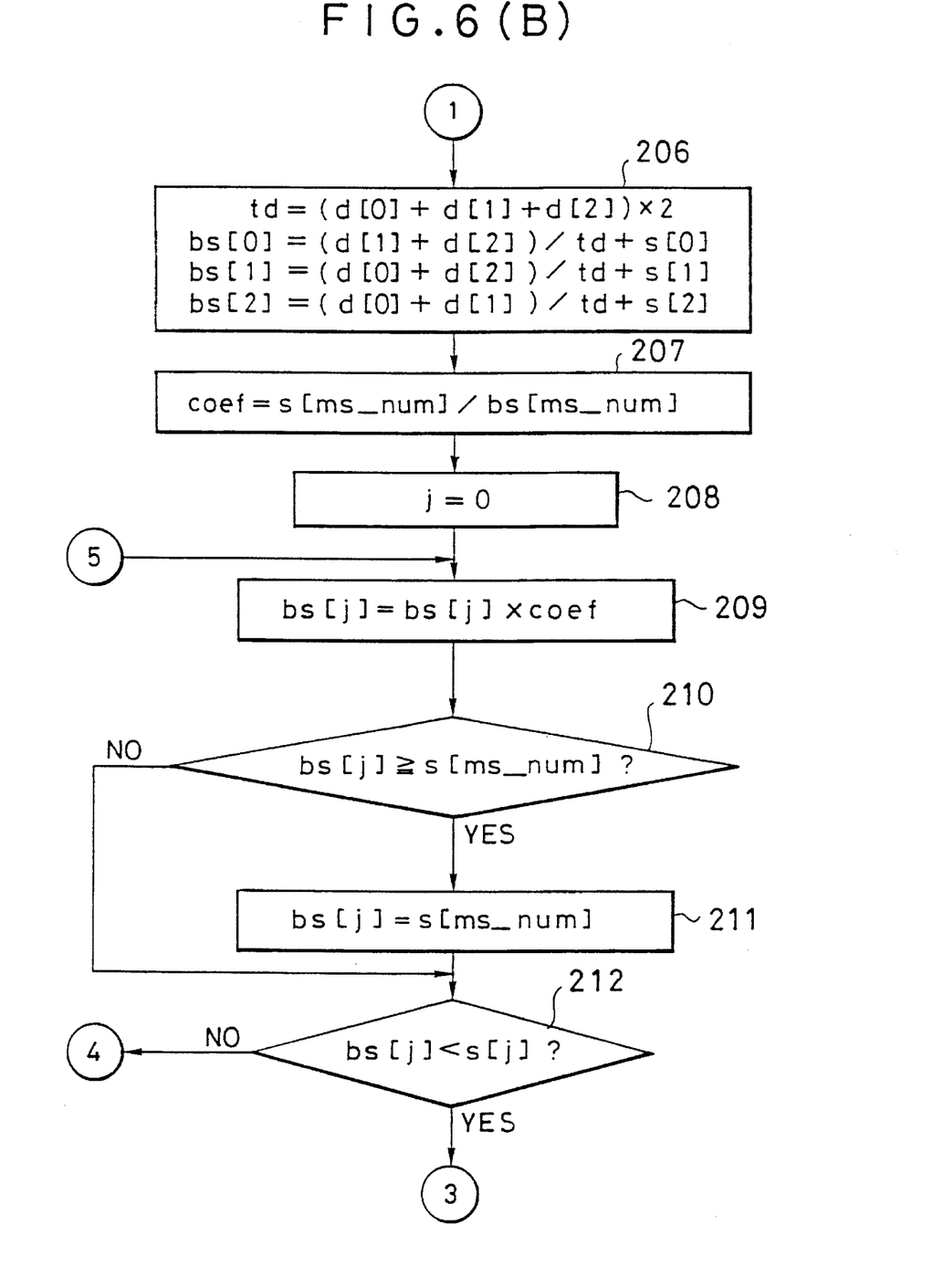
Figure 6C:
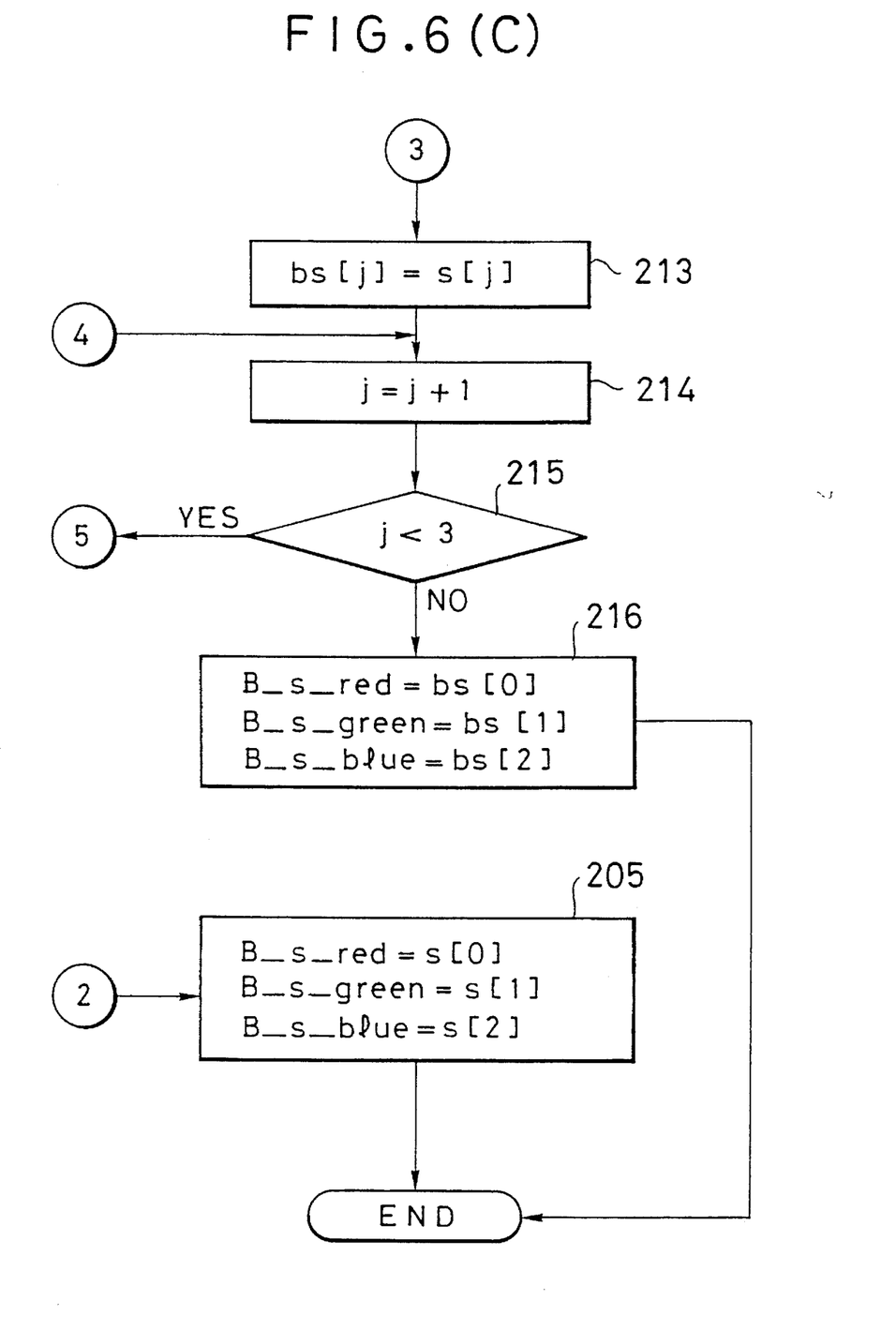

Regarding to the specular reflectivity, they can calculated by the procedure shown in FIGS. 6(A)–(C). First, the initialization is carried out by substituting 0.0 and 0.0 into the intermediate variables ms and md of the specular reflectivity and the diffuse reflectivity, respectively (Step 201).

Next, each diffuse reflectivity parameter $A\_d\sim$ and each specular reflectivity parameter $A\_s\sim$ are substituted into the memory variable d [0], d [1] and d [2] and into the specular reflectivity memory variables s [0], s [1] and s [2], respectively (Step 202).

Thereafter the maximum value of the specular reflectivity substituted into the memory variables s [0], s [1] and s [2]

is substituted into the intermediate variable ms. The arrangement numbers 0, 1, 2 of the intermediate variable having said maximum value are substituted into the index ms_num. In addition, the maximum value of the diffuse reflectivity stored into the memory variables d [0], d [1] and d [2] is substituted into the intermediate variable md (Step 203).

Next each of the intermediate variables md and ms is checked if it is 0.0 or not (Step 204). When the result shows that one of the intermediate variable md and ms is 0.0 the calculation procedure proceeds to the Step 205 shown in FIG. 6 (C) so that the specular reflectivity (the specular reflectivity in the system A of each of the memory variable s [0], s [1] and s [2] is substituted into the specular reflectivity parameter B_s_~ of the system B (Step 205). In this case, both of the diffuse reflectivity and the specular reflectivity factor are zero, only parameter left is the ambient reflectivity.

Thereafter, the color matching coefficient td is obtained from equation (30) and the specular reflection factors for colors in said memory variables d [0], d [1] and d [2] are converted according to equation (31)–(33) by using each of diffuse reflectivity for colors in the memory variables d [0], d [1] and d [3] and the color matching coefficient td and the converted values thus obtained are substituted into the memory variable bs [0], bs [1] and bs [2] (Step 206).

$$td=(d[0]+d[1]+d[2])\times 2 \tag{30}$$

$$bs[0]=(d[1]+d[2])/td+s[0] \tag{31}$$

$$bs[1]=(d[0]+d[2])/td+s[1] \tag{32}$$

$$bs[2]=(d[0]+d[1])/td+s[2] \tag{33}$$

The conversions in accordance with the equations (30)–(33) are carried out in order to add the addition correction in which the specular reflectivity for each color is added with the diffuse reflectivity for another color.

Next by using the number ms_num representing the maximum specular reflectivity obtained in the step 203, the ratio between s [ms_num] before correction and the number bs [ms_num] after the correction is obtained by the following equation (34):

$$coef=s[ms\_num]/bs[ms\_num] \tag{34}$$

and the ratio thus obtained is substituted into the variable coef (Step 207).

Thereafter the initialization for setting the index j to 0 is effected (Step 208) and in order to normalize the memory variable bs [j] after correction, it is multiplied by the variable coef by equation (35), thereby obtaining a new bs (Step 209):

$$bs[j]=bs[j]\times coef \tag{35}$$

Then the memory variable bs [j]. obtained from equation (35) is compared with the maximum value s [ms_num] of the specular reflection factor (Step 210). When the result is positive, the maximum value s [ms_num] of the specular reflection factor is substituted into the correction memory variable bs [j] (Step 211) and the calculation procedure proceeds to the next Step 212. On the other hand, when the result is negative, the memory variable bs [j] is left unchanged and then the procedure proceeds to the Step 212. Therefore, the specular reflectivity can be normalized.

That is, the maximum value after correction of the specular reflectivity for each color is suppressed so as not to exceed the maximum value before the correction.

Next the values of the variables bs [j] obtained by the conversion equations (30)–(33) are compared with the values s [j] prior to the correction of the memory variables (Step 213). When the result is positive, the value s [j] is inserted into the memory variable bs [j] as shown in Step 213, but when the result is negative, the memory variable bs [j] is left unchanged and the calculation procedure proceeds to the next step.

Thereafter, the index j is incremented by one (Step 214) and as the result of such increment, when the condition j <3 is satisfied, the calculation procedure returns to the Step 209 in order to convert the next memory variable bs [j] (for instance, if j=1, j is changed to two) and the steps succeeding the Step 209 inclusive are carried out (Step 215). On the other hand, if j<3 is not satisfied and the condition j≧3 is satisfied, the next Step 216 is carried out.

Next the value of the memory variable bs [0] is inserted into the specular reflectivity parameter (red) B_s_red for system B; the memory variable bs [1] is inserted into the parameter (green) B_s_green; and the value of the memory variable bs [2] is inserted into the parameter B_s_blue (Step 216). After the Step 216 has been carried out or the Step 205 has been accomplished, of the texture information parameters, the specular reflectivity for the system A are converted into those for the system B.

As to the specular reflection factor parameter A_exp, that for the system A is converted into that for the system B by, for instance, by the following equation (36).

$$B\_exp=A\_exp\times 2/5 \tag{36}$$

The constant 2/5 in equation (36) is used to match the high light due to the difference in aperture in both of the systems A and B. In order to obtain this constant, various data have been tested and the constant was selected in accordance to experience. Of course, it is possible to select a suitable value depending upon the characteristics of the systems A and B.

Figure 7:
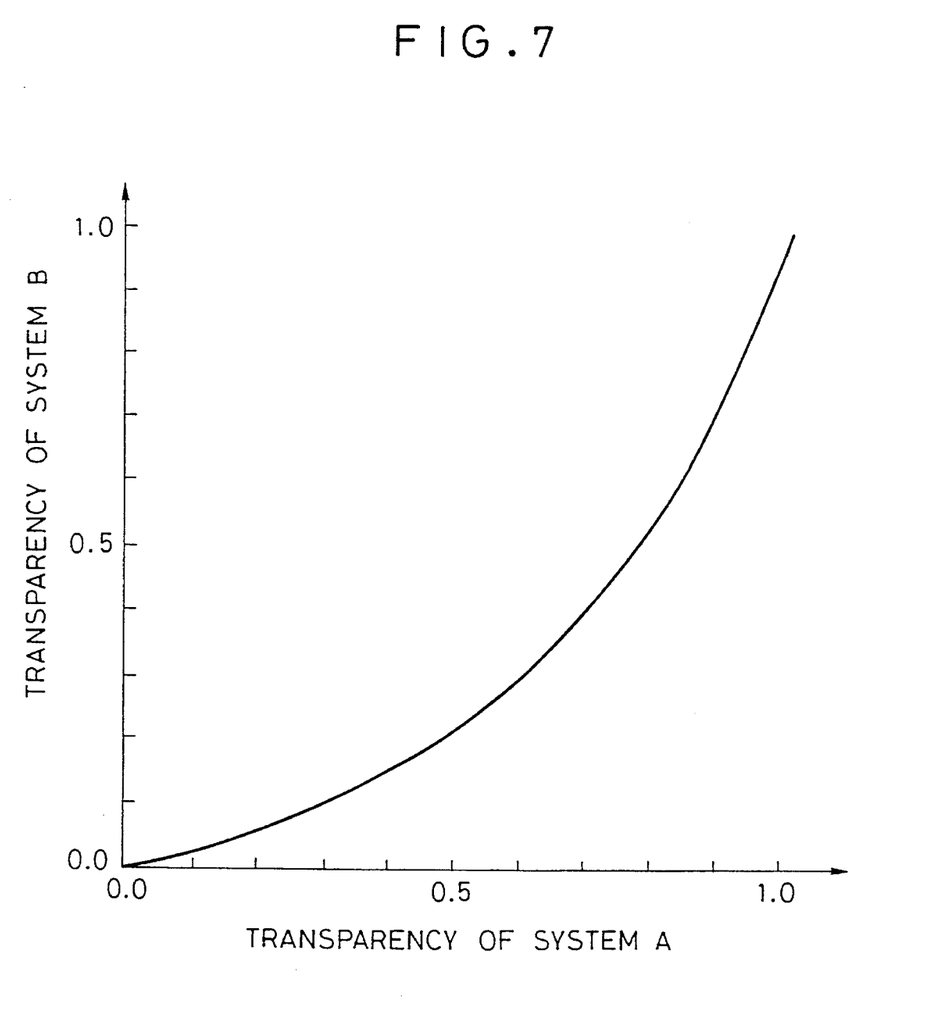
FIG. 7 is a graph illustrating an example of the conversion of a transmission coefficient.

As to the transparency parameter A_transparency, that for the system A is converted into that for the system B, for instance, by the table shown in FIG. 7.

The table in FIG. 7 is obtained through various data, and it is possible to select a suitable value depending upon the characteristics of the systems A and B.

The mapping image information parameter conversions are carried out in the following manners.

In the system A, the mapping image information parameters for red, green and blue are represented by A_C_red, A_C_green and A_C_blue. When the system A effected the mapping by utilizing the mapping image information, the ambient reflectivity and the diffuse reflectivity parameters A_a_red, A_d_red and so on are calculated by the equations (37)–(42).

$$A\_a\_red=A\_a\_red\times A\_c\_red \tag{37}$$

$$A\_a\_green=A\_a\_green\times A\_c\_green \tag{38}$$

$$A\_a\_blue=A\_a\_blue\times A\_c\_blue \tag{39}$$

$$A\_d\_red=A\_d\_red\times A\_c\_red \tag{40}$$

$$A\_d\_green=A\_d\_green\times A\_c\_green \tag{41}$$

$$A\_d\_blue=A\_d\_blue\times A\_c\_blue \tag{42}$$

The mapping image information parameter for red, green and blue for use in the system B are represented by B_c_red, B_c_green and B_c_blue. In this case, when the system B effects the mapping by utilizing the mapping image information parameter, the parameter of the ambient reflectivity and the diffuse reflectivity are calculated by the following equation.

$$B\_a\_red = B\_c\_red \times B\_a\_red \quad (43)$$

$$B\_a\_green = B\_c\_green \times B\_a\_green \quad (44)$$

$$B\_a\_blue = B\_c\_blue \times B\_a\_blue \quad (45)$$

$$B\_d\_red = B\_c\_red \quad (46)$$

$$B\_d\_green = B\_c\_green \quad (47)$$

$$B\_d\_blue = B\_c\_blue \quad (48)$$

Hence, from equations (37)–(48), the mapping image information parameter A_c~ for the system A are converted into those for use in the system-B by the following equations (49)–(51).

$$B\_c\_red = A\_c\_red \times B\_d\_red \quad (49)$$

$$B\_c\_green = A\_c\_green \times B\_d\_green \quad (50)$$

$$B\_c\_blue = A\_c\_blue \times B\_d\_blue \quad (51)$$

Next the light source information parameter are converted as follow. In this case, the light source information parameters for the system A consist of the light position (expressed by the X, Y, Z coordinate system): that is, A_x, A_y and A_z; the light direction (represented by the X, Y, Z coordinate system): that is, A_nx, A_ny and A_nz; the aperture of the light is represented by A_exp; the colors of the light (expressed by the three primary colors—red, green and blue): that is, A_red, A_green and A_blue; and the type of light source is (expressed by the parallel light rays, a spot light source and point light source) A_mode. In this case, it is assumed that the intensity of a light source is maintained constant.

In like manner, as in the case of the system B, the light position is represented by B_x, B_y and B_z; the light direction, by B_nx, B_ny and B_nz; the aperture of the light, B_exp; the colors of light, by B_red, B_green and B_blue; the intensity of light, by B_intensity; and the type of a light source, by B_mode.

The light source intensity of the system B is damped according to 1/distance. Therefore, the intensity of light, by B_intensity is utilized to prevent over darkness.

In the cases of the conversion, the light position (three-dimensional position); the aperture of light; the colors of light; and the type of light source are not converted and substituted into the system B without any modification and only the intensity of the light source is newly calculated. In this case, the intensity of light source is represented by a distance between the light source and a shape surface data most closely located to the light source because the shape surface thus selected is most prominent as compared with the other shape surface.

Next the mode of operation of the above-described embodiment will be explained.

In this embodiment, instead of rendering the CG model including the shape data, the camera-shape position data, the light source information parameter, the texture information parameter and the mapping image information parameter and so on by the system A, they are subjected to the rendering by the high-speed rendering in the system B. In this case, the texture model consisting of the light, texture and mapping image information parameter generated for use in the system A is converted into the texture for use in the system B in such a way that the difference in shading calculation model between the systems A and B can be absorbed.

More specifically, the texture information parameter is converted in accordance with the equations (11)–(36) and to the flowchart shown in FIG. 6 by a texture parameter converter 62 and stored in a storage device 56 in which the converted texture parameter for use in the system B is read in and stored.

As to the mapping image information parameter, it is converted in a mapping image information converter 64 according to the equations (37)–(51) and delivered to the system B. In the cases of conversion and processing of the mapping image information parameter, the texture information parameter read-storage device 50, the diffuse reflectivity parameter of the surface shown in equation (12) is inputted.

As the conversions of the light source information parameters, said light source position, the direction of the light source, the aperture of the light source, the colors of light and the type of a light source are substituted without any modification thereof and only the intensity of the light source is newly calculated. In this case, the distance between the light source and a spherical surface data most closest to the light source can be used as the intensity of the light source. The shape information and the shape position information stored in the shape and shape position information input device 42, the camera information and the camera position stored in the camera-information and camera-position storage device 68, and the texture information parameter the mapping image information parameter and the light source information parameter of the texture model stored in the system B texture model read-storage device 44 are rendered by the projected image generating device (rendering device) 46 which is the system B.

The construction of the projected image generating device 46 which is the system B is disclosed in detail in the Japanese Patent Application NO.60-149765 so that no detailed explanation thereof shall not be made in this specification.

As described above, the texture model, the shape data and so on for use in the system A is delivered into the system B so that the CG picture can be rendered at a high speed in the system B.

What is claimed is:

1. A three-dimensional graphic image generating apparatus for generating a three-dimensional graphic image from at least one of a plurality of information parameters of a computer graphic surface model, said plurality of information parameters comprising object shape information parameters, camera information parameters, camera position information parameters, object shape position information parameters, texture information parameters, light source information parameters, and mapping information parameters including texture image information parameters, said information parameters generated by a first system, said three-dimensional graphic image produced by a second system having a different shading calculation model than the first system, said three-dimensional graphic image generating apparatus comprising:

(a) an interface including:

texturing means for receiving the texture information parameter of said first system and for converting the texture information parameter of the first system into a texture information parameter for said second system and for absorbing a difference of shading calculation model between said first system and said second system, wherein the texture information of the first system includes at least one of an ambient reflectivity parameter of an object surface, a specular reflectivity parameter of the object surface, a diffuse reflectivity parameter of the object surface, a specular reflection parameter and a transparency parameter;

light source means for receiving the light source information parameter of said first system, for converting the light source information parameter of the first system into a light source information parameter for said second system and for absorbing a difference of a light source information format or a lighting model between said first system and said second system; and mapping means for receiving the mapping information parameter of said first system, for converting said mapping information parameter of said first system into a mapping information parameter for said second system, wherein the mapping information parameter of the first system includes the correction of the two-dimensional vertex coordinates of the texture image; and (b) receiving means for receiving selected ones of the information parameters of said first system in a first format, and for converting said selected ones of the information parameters in said first format into information parameters of said interface in a second format, wherein the receiving means applies an addition correction factor to the selected ones of the information parameters in said first format to convert the selected ones of the information parameters in said first format into the second format, the addition correction factor being based on the diffuse reflectivity parameters of first, second and third colors of a color model of the first system, and the specular reflectivity parameter of the third color of the color model of the first system.

2. The computer graphic image generating apparatus of claim 1, wherein said texturing means converts the texture information parameter of the first system into the texture information parameter of the second system using a correction coefficient to match a high light occurring in both the first and the second systems.

3. The computer graphic image generating apparatus of claim 1, wherein said texturing means converts the specular reflectivity parameter of the first system into the specular reflectivity parameter of the second system using the specular reflectivity parameter and the diffuse reflectivity parameter of the first system.

4. A three-dimensional graphic image generating apparatus for converting a first computer graphic surface model of a first system, including at least one of a plurality of parameters, into a second computer graphic surface model of a second system having a different shading calculation model than the first system, said plurality of parameters comprising a texture information parameter, a light source parameter, and a mapping parameter including a texture image parameter, said three-dimensional graphic generating apparatus comprising:

texturing means for receiving the texture information parameter from said first system and for converting the texture information parameter of the first system, wherein the texture information parameter includes an ambient reflectivity parameter of an object surface, a diffuse reflectivity parameter of the object surface, a specular reflectivity parameter of the object surface, a specular reflectivity parameter, and a transparency parameter, the texturing means converting the texture information parameter of the first system into the texture information parameter of the second system by applying an addition correction factor to the texture information parameter of the first system, the addition correction factor being based on the diffuse reflectivity parameters of first, second and third colors of a color model of the first system and a specular reflectivity parameter of the third color of the color model of the first system;

light source means for receiving the light source information parameter from said first system, for converting the light source information parameter of the first system into a light source information parameter for said second system and for absorbing a difference of a light source information format or a lighting model between said first system and a second system; and mapping means for receiving the mapping information parameter of said first system and for converting the mapping parameter of the first system into a mapping information parameter for said second system, wherein the mapping information parameter of the first system includes the correction of the two-dimensional vertex coordinates of the texture image.

5. The computer graphic image generating apparatus of claim 4, wherein said texturing means converts the texture information parameter of the first system into the texture information parameter of the second system using a correction coefficient to match a high light occurring in both the first and the second systems.

6. The computer graphic image generating apparatus of claim 4, wherein said texturing means converts the specular reflectivity parameter of the first system into the specular reflectivity parameter for the second system using the specular reflectivity parameter and the diffuse reflectivity parameter of the first system.

* * * * *